United States Patent
Chorvat et al.

[11] 3,865,833
[45] Feb. 11, 1975

[54] 1,3-DIETHERS OF 2-AZAESTRATRIENES AND INTERMEDIATES

[75] Inventors: Robert J. Chorvat, Arlington Heights; Raphael Pappo, Skokie, both of Ill.

[73] Assignee: G. D. Searle & Co., Chicago, Ill.

[22] Filed: Feb. 20, 1973

[21] Appl. No.: 333,792

[52] U.S. Cl.............. 260/289 AZ, 260/345.2, 260/346.2 M, 260/346.7, 260/346.8, 424/258
[51] Int. Cl............................ C07d 101/00
[58] Field of Search...................... 260/289 AZ

[56] References Cited
UNITED STATES PATENTS
3,280,133  10/1966  Pappo et al. .............. 260/289 AZ
3,290,287  12/1966  Mazur et al. .............. 260/289 AZ

*Primary Examiner*—Donald G. Daus
*Assistant Examiner*—Mary C. Vaughn
*Attorney, Agent, or Firm*—John A. Dhuey; Elliot N. Schubert

[57] ABSTRACT

1,3-Diethers of 2-azaestratrienes are valuable pharmacological agents as is evidenced by their lipid-mobilizing properties.

The present invention relates to 1,3-dietherified 2-azaestratrienes represented by the following structural formula

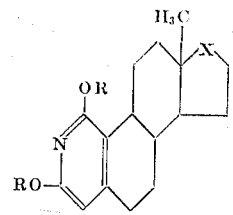

wherein X represents a carbonyl, $\beta$-hydroxymethylene, $\beta$-(lower alkanoyl)oxymethylene, $\alpha$-(lower alkyl)-$\beta$-hydroxy=methylene, $\alpha$-(lower alkynyl)-$\beta$-hydroxymethylene or $\alpha$-propadienyl-$\beta$-hydroxymethylene radical and R is a lower alkyl, lower cycloalkyl or tri-(lower alkyl) silyl group.

The lower alkyl groups represented in the foregoing structural formula are typified by methyl, ethyl, propyl, butyl, pentyl, hexyl, heptyl and the branched-chain isomers thereof.

The lower cycloalkyl radicals denoted in that formula are typified by cyclopentyl and cyclohexyl.

Especially preferred embodiments of the present invention are those ethers wherein R represents a lower alkyl radical.

4 Claims, No Drawings

1,3-DIETHERS OF 2-AZAESTRATRIENES AND INTERMEDIATES

The compounds of this invention display valuable pharmacological properties as is evidenced by their ability to mobilize lipids from storage depots into the blood stream. In addition, they possess antiprotozoal, antifungal and anthelmintic properties, as is verified by activity in the assays described in U.S. Pats. Nos. 3,542,802 and 3,668,251.

Their lipid-mobilizing properties are evidenced by activity in the following assay:

A group of 8 male rats weighing 180–220 g. is maintained for 6 days on a sucrose enriched diet consisting of:

| Ingredient | % By Weight |
| --- | --- |
| Sucrose | 68% |
| Casein | 18% |
| Corn Oil | 5% |
| Salt | 4% |
| Vitamin | 2% |
| Cellulose | 3% |

On days 7 through 10 the animals are injected subcutaneously with the selected dose of the test compound and are maintained on the diet as described above. The test compound is administered in a suitable vehicle such as saline or corn oil in a volume of 1 ml./kg. of body weight. During the 10-day period the food consumption and body weights are measured and recorded. On the night of the 10th day the animals are fasted and plasma samples are taken the next morning for determination of cholesterol and triglyceride levels. These values are compared with those of a control group treated as above except for omission of the test compound. A compound causing a significant increase ($P \leq 0.05$) in both cholesterol and triglyceride levels is rated as an active lipid mobilizing agent.

Manufacture of the instant novel compounds is conveniently effected by utilizing as the starting material 6β,19-epoxy-17β-hydroxy-1-oxo-A-nor-1, 2-secoandrost-3-en-2-oic acid, the preparation of which is described in Example 6 of U.S. Pat. No. 3,644,342. Oxidation of that aldehydo acid, typically with the Jones reagent, i.e. aqueous chromic acid, affords the anhydride, i.e. 2-oxa-6β,19-epoxyandrost-4-ene-1,3,17-trione. Conversion of that anhydride to the corresponding imide, i.e. 2-aza-6β,19-epoxyandrost-4-ene-1,3,17-trione is effected by reaction with ammonium acetate in acetic acid. Cleavage of the epoxide linkage, suitably by reaction with zinc and silver acetate, results in 2-aza-19-hydroxyandrost-5-ene-1,3,17-trione. Oxidation of the 10β-hydroxymethyl group with the aforementioned Jones reagent followed by treatment with ethanolic sodium hydroxide solution affords 2-azaestr-5(10)-ene-1,3,17-trione. That 2-aza-1,3,17-trione is converted to a mixture of 2-aza-1,3-dimethoxy=estra-1,3,5(10)-trien-17-one and N-methyl-2-aza-3-methoxy=estra-3,5(10)-diene-1,17-dione by reaction with diazomethane. Those products are separated chromatographically. Substitution for diazomethane of a higher diazoalkane, e.g., diazoethane, affords the corresponding 1,3-dialkoxy and N-alkyl-3-alkoxy derivatives of the present invention.

The instant 17α-alkyl and 17α-alkynyl compounds are readily obtained by reaction of the corresponding 17-keto substance with the appropriate Grignard reagent. Typically, 2-aza-1,3-dimethoxyestra-1,3,5(10)-trien-17-one is contacted with acetylene magnesium bromide and the resulting adduct is decomposed by means of dilute hydrochloric acid to afford 2-aza-17α-ethynyl-1,3-dimethoxy=estra-1,3,5(10)-triene-17α-ol. Similarly, reaction of that 17-ketone with methyl magnesium bromide affords 2-aza-1,3-dimethoxy-17α-methylestra-1,3,5(10)-trien-17α-ol.

The instant 17-esters are produced by esterification of the corresponding 17-alcohols by conventional means, suitably by reaction with a lower alkanoic acid anhydride or halide, preferably in the presence of a suitable acid acceptor such as triethylamine, pyridine, etc.

The 17-alcohols are obrained by hydrolysis of the aforementioned 6β, 19-epoxy-2-oxaandrost-4-ene-1,3,17-trione with aqueous sodium hydroxide, reduction of the 17-keto group with sodium borohydride, recyclization and acetylation with acetic anhydride to form 17β-acetoxy-6β,19-epoxy-2-oxaandrost-4-ene-1,3-dione followed by conversion of the latter substance to the corresponding compounds of this invention by the reaction sequence described hereinbefore.

The trialkylsilyl ethers of this invention are conveniently manufactured by reaction of a 2-aza-1,3-dione of this invention with the appropriate tri=alkylchlorosilane. That process is exemplified by the reaction of 2-azaestr-5(10)-ene-1,3,17-trione with trimethylchlorosilane, in the presence of triethylamine, thus affording 2-aza-1,3-bis-(trimethylsilyloxy)estra-1,3,5(10)-trien-17-one.

The compounds of this invention wherein the ether groups are cycloalkyloxy are suitably manufactured by reaction of the 2-aza-1,3-dione with the appropriate cycloalkyl halide, preferably in the presence of a suitable catalyst such as silver carbonate. Typically, 2-aza-17β-hydroxyestr-5(10)-ene-1,3-dione is allowed to react with cyclopentyl iodide and silver carbonate to yield 2-azaestra-1,3,5 (10)-triene-1,3,17β-triol 1,3-bis-cyclo=pentyl ether.

The instant 17β-propadienyl derivatives are conveniently produced from the corresponding 17-keto compounds by reaction with 3-tetrahydropyran-2'-yloxy-prop-1-ynyl magnesium bromide followed by reaction, typically with lithium aluminum hydride, of the resulting propynyl carbinol. Specifically, 2-aza-1,3-dimethoxyestra-1,3,5(10)-trien-17-one is contacted with the latter Grignard reagent and the resulting propynyl carbinol is allowed to react with lithium aluminum hydride to yield 2-aza-1,3-dimethoxy-17α-propadienylestra-1,3,5(10)-trien-17β-ol.

The invention will appear more fully from the examples which follow. These examples are given by way of illustration only and are not be to construed as limiting the invention either in spirit or in scope as many modifications both in materials and methods will be apparent from this disclosure to those skilled in the art. In these examples temperatures are given in degrees Centigrade (°C.) and quantities of materials in parts by weight unless otherwise noted.

EXAMPLE 1

To a solution of 4.85 parts of 6β,19-epoxy-17β-hydroxy-1-oxo-1,2-seco-A-norandrost-3-en-2-oic acid in 200 parts by volume of acetone, cooled to approximately −15°, is added 10 parts by volume of an aqueous solution, 8 N in chromium trioxide and 8 N in sulfuric acid, at such a rate that the temperature is maintained below −5°. After the addition is complete the reaction mixture is allowed to stand for about 16 hours at approximately 0°, at which time the excess oxidant is destroyed by the addition of the small quantity of isopropanol. The precipitate present is removed by filtration and the filtrate is concentrated under reduced pressure, then diluted with approximately 100 parts of water while stirring. The product which precipitates is removed by filtration and the filtrate is extracted several times with chloroform. The chloroform extracts are combined, washed with 5 percent aqueous sodium bicarbonate, then dried over anhydrous sodium sulfate and stripped of solvent under reduced pressure to afford an additional quantity of product. The several fractions of crude product are combined and purified by recrystallization from acetone, thus affording 6β,19-epoxy-2-oxaandrost-4-ene-1,3,17-trione, melting at about 263°−264°. This compound exhibits an ultraviolet absorption maximum at about 223 millimicrons with a molecular extinction coefficient of approximately 8,550. This compound is characterized further by the following structural formula

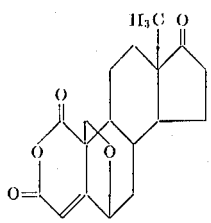

EXAMPLE 2

To a warm solution consisting of 125 parts of ammonium acetate in 150 parts by volume of acetic acid is added 17.1 parts of 6β,19-epoxy-2-oxaandrost-4-ene-1,3,17-trione and the resulting reaction mixture is heated at the reflux temperature for about 90 minutes. At the end of that time the mixture is cooled and diluted with approximately 500 parts of water, thus effecting precipitation of the crude product. Additional crude product is isolated by concentration of the filtrate and cooling. The resulting filtrate is extracted with chloroform and the organic extract is extracted with 5 percent aqueous sodium hydroxide. The alkaline extract is acidified by the addition of dilute hydrochloric acid, thus affording still further crude product. The crude fractions are combined and purified by recrystallization from aqueous acetic acid to yield 6β,19-epoxy-2-azaandrost-4-ene-1,3,17-trione, which compound melts at about 290°−292° with decomposition. In methanol it diaplays an ultraviolet absorption peak at approximately 220 millimicrons while infrared absorption maxima, in chloroform, are observed at about 2.96 and 5.80 microns. Nuclear magnetic resonance maxima are displayed at 60, 232, 240, 257, 265, 294, 299 and 351 hertz. This compound is characterized by the following structural formula

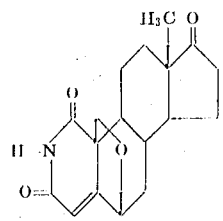

EXAMPLE 3

To a solution of 13.3 parts of 6β,19-epoxy 2-azaandrost-4-ene-1,3,17-trione in 600 parts by volume of ethanol containing 400 parts by volume of glacial acetic acid and 200 parts of water, in a nitrogen atmosphere, is added 38 parts of silver acetate and 260 parts of zinc dust. The resulting reaction mixture is stirred vigorously with heating at the reflux temperature for approximately 2 hours. At the end of that time the reaction mixture is filtered through diatomaceous earth and the filtrate is partially concentrated under reduced pressure. To that solution is then added approximately 1,000 parts of water and the resulting turbid solution is extracted several times with chloroform. The combined extracts are washed with saturated aqueous sodium chloride, then dried over anhydrous sodium sulfate and stripped of solvent under reduced pressure to afford an oily residue. Trituration of that oil with ether affords a solid, which is recrystallized from aqueous ethanol, thus producing 2-aza-19-hydroxyandrost-5-ene-1,3,17-trione, which melts at about 231°−236° with decomposition. Infrared absorption maxima are observed at 2.97, 5.75 and 5.85 microns. Nuclear magnetic resonance peaks are displayed at about 58, 181, 190, 217, 232, 243, 247, 258 and 348 hertz. This compound is represented by the following structural formula

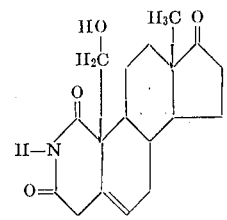

EXAMPLE 4

To 8.15 parts of 2-aza-19-hydroxyandrost-5-ene-1,3,17-trione dissolved in 300 parts by volume of acetone is added, at approximately −10°, 15 parts by volume of an aqueous solution, 8 N in chromium trioxide and 8 N in sulfuric acid, at such a rate that the temperature remains below −5°. After stirring at that temperature for approximately 1 hour the excess oxidant is destroyed by the addition of a small quantity of isopropanol and the precipitate which forms is isolated by filtration. The filtrate is stripped of solvent by distillation under reduced pressure and the resulting residue is dissolved in a solution consisting of 50 parts by volume of methanol and 50 parts by volume of 5 percent aqueous sodium hydroxide. That reaction mixture is heated at the reflux temperature for about 30 minutes, then cooled and acidified by the addition of glacial acetic acid. Extraction of that acidic mixture with chloroform affords an organic solution, which is washed with saturated aqueous sodium chloride, then dried over anhydrous sodium sulfate and concentrated to dryness under reduced pressure. The resulting oily residue is triturated with acetone to afford, as an amorphous solid, a mixture of 2-azaestr-5(10)-ene-1,3,17-trione and 2-azaestr-4-ene-1,3,17-trione. This product displays, in methanol, an ultraviolet absorption maximum at 326 millimicrons with a molecular extinction coefficient of about 2,900 and also a maximum at about 244 millimicrons with a molecular extinction coefficient of about 5800. In deuterochloroform, nuclear magnetic resonance peaks are displayed at 55, 199 and 360 hertz.

EXAMPLE 5

A slurry consisting of 3.75 parts of a mixture of 2-azaestr-5(10)-ene-1,3,17-trione and 2-azaestr-4-ene-1,3,17-trione in 150 parts by volume of a 1:1 ether-methanol mixture is cooled to approximately −5° and ethereal diazomethane is added until the presence of a excess reagent is evidenced by the persistence of a yellow color. During the addition the temperature is maintained below 0°. After addition is complete the reaction mixture is allowed to warm to room temperature. It is stored at that temperature for approximately 2 hours, then is stripped of solvent by distillation under reduced pressure. The resulting oil is purified by chromatography on silicic acid using benzene and benzene-ethyl acetate as eluting solvents. The initial fractions afford the crude product, which is purified by recrystallization from hexane, thus yielding pure 2-aza-1,3-dimethoxyestra-1,3,5(10)-trien-17-one, melting at about 125.5°–127.5°. This compound displays, in methanol, ultraviolet absorption peaks at about 281 and 230 millimicrons with molecular extinction coefficients of approximately 7000 and 8800, respectively, infrared absorption maxima, in chloroform, at about 5.75, 6.21 and 6.35 microns and nuclear magnetic resonance maxima, in deuterochloroform, at about 57, 233, 236 and 364 hertz.

The later fractions afford a product, which is purified by recrystallization from acetone to yield N-methyl-2-aza-3-methoxyestra-3,5(10)-diene-1,17-dione, melting at about 219°–222°. This compound displays, in methanol, an ultraviolet absorption maximum at about 305 millimicrons with a molecular extinction coefficient of about 10,100 and also a maximum at about 235 millimicrons with a molecular extinction coefficient of about 5200. In chloroform it displays infrared absorption peaks at about 5.75, 6.05 and 6.45 microns. Nuclear magnetic resonance peaks, in deuterochloroform, are observed at about 56, 204, 231 and 318 hertz.

EXAMPLE 6

50 Parts by volume of tetrahydrofuran is cooled to approximately −70° under nitrogen and acetylene gas is passed through over a period of about 45 minutes. To the resulting solution is then added 6.5 parts by volume of ethereal 3 N ethyl magnesium bromide and the cooling bath is removed in order to allow the solution to warm to room temperature. At that time 1.05 parts of 2-aza-1,3-dimethoxyestra-1,3,5(10)-trien-17-one dissolved in 10 parts by volume of tetrahydrofuran is added over a period of about 5 minutes. That reaction mixture is stirred at room temperature for about 3 hours, at the end of which time 25 parts by volume of 1 N hydro=chloric acid is added dropwise with cooling. The mixture is partitioned between water and chloroform and the aqueous layer is separated, then extracted with fresh portions of chloroform. The combined organic extracts are washed successively with 5 percent aqueous sodium bicarbonate and saturated aqueous sodium chloride, then dried over anhydrous sodium sulfate and stripped of solvent under reduced pressure. The resulting oily residue is dissolved in a mixture of ether and hexane and the resulting solution is decolorized with activated carbon. The decolorized solution is concentrated under reduced pressure and the remaining solution is decanted from the amorphous solid which forms. The decanted solution is again decolorized after addition of hexane, following which time the solvents are distilled under reduced pressure to afford an oily product. That oily product crystallizes upon standing, then is purified by trituration with pentane to afford pure 2-aza-17α-ethynyl-1,3-dimethoxyestra-1,3,5(10)-trien-17β-ol, melting at about 101°–105°. This compound exhibits, in methanol, ultraviolet absorption maxima at about 281 and 230 millimicrons with molecular extinction coefficients of about 7350 and 9200, respectively. Infrared absorption peaks in chloroform are observed at about 2.77, 3.02, 6.22, 6.90 and 7.23 microns. In deuterochloroform nuclear magnetic resonance maxima are observed at about 55, 156, 233, 235 and 362 hertz. This compound is represented by the following structural formula

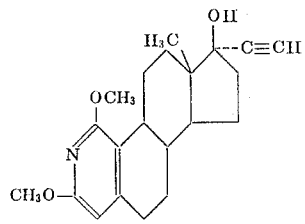

EXAMPLE 7

To a slurry consisting of 12 parts of 6β,19-epoxy-2-oxaandrost-4-ene-1,3,17-trione in 100 parts of water is added a solution consisting of 3.2 parts of sodium hydroxide dissolved in 20 parts of water. The slurry becomes homogeneous after several minutes of stirring and a solution of 1.45 parts of sodium borohydride in 20 parts of water is then added. The reaction mixture is stirred at room temperature for 1 ½ to 2 hours, then is cooled to approximately 5° and acidified by the addition of 6 N hydrochloric acid. The white precipitate which forms is collected by filtration to afford the crude product, which is purified by recrystallization from aqueous acetone, thus affording hydrated 6β,19-epoxy-17β-hydroxy-1,2-seco-A-norandrost-3-ene-1,2-dioic acid, melting at about 278°–281°. This compound exhibits an ultraviolet absorption maximum, in methanol, at about 220 millimicrons with a molecular extinction coefficient of about 7,000. Infrared absorption peaks, in chloroform, are displayed at about 5.79 and 6.22 microns. In deutero=pyridine nuclear magnetic resonance peaks are displayed at 61, 224, 232, 240, 270, 278, 284, 292, 285, 290 and 380 hertz. This compound is represented by the following structural formula

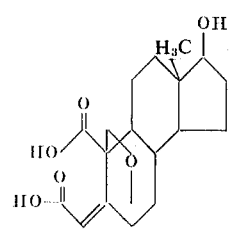

EXAMPLE 8

A solution containing 12.4 parts of 6β,19-epoxy-17β-hydroxy-A-norandrost-3-ene-1,2-dioic acid in 75 parts by volume of acetic anhydride is heated at the reflux temperature for 90–120 minutes, then is cooled and diluted with approximately 300 parts of water. The initially gummy precipitate which forms solidifies upon standing and is isolated by filtration to afford the crude product. Recrystallization from acetone yields pure 17-β-acetoxy-6β,19-epoxy-2-oxaandrost-4-ene-1,3-dione, melting at about 242°–243°. In methanol this compound exhibits an ultraviolet absorption maxima at about 225 millimicrons with a molecular extinction coefficient of about 8650. In chloroform its infrared absorption spectrum displays maximum at about 5.54, 5.67 and 5.75 microns. Nuclear magnetic resonance peaks in deuterochloroform are observed at 54, 122, 233, 242, 257, 266, 291, 296 and 360 hertz.

EXAMPLE 9

A mixture consisting of 90 parts of ammonium acetate and 105 parts by volume of glacial acetic acid is warmed until homogeneous, at which time 13.25 parts of 17β-acetoxy-6β,19-epoxy-2-oxaandrost-4-ene-1,3-dione is added. The reaction mixture is heated at the boiling temperature in a nitrogen atmosphere for about 1–2 hours, then is cooled and diluted with approximately 250 parts of water. The crude product which precipitates is isolated by filtration and recrystallized from aqueous ethanol to produce pure 17β-acetoxy-2-aza-6β,19-epoxy=androst-4-ene-1,3-dione, melting with decomposition, at about 331°–332°. This compound exhibits an ultraviolet absorption maximum at about 220 millimicrons. Infrared absorption peaks in chloroform are observed at 2.95, 5.82 and 5.93 microns. In a mixture of deuterochloroform and deuterotrifluoroacetic acid nuclear magnetic resonance peaks are displayed at about 55, 125, 232, 241, 258, 267, 293–98 and 362 hertz. This compound is further characterized by the following structural formula

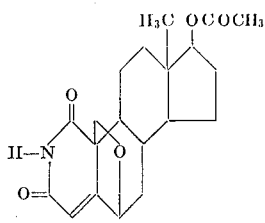

EXAMPLE 10

To a solution of 11.8 parts of 2-aza-17β-acetoxy-6β,19-epoxyandrost-4-ene-1,3-dione in 600 parts by volume of ethanol containing 350 parts by volume of glacial acetic acid and 175 parts of water, in a nitrogen atmosphere, is added 25.2 parts of silver acetate followed by 252 parts of finely powdered zinc dust. The reaction mixture is vigorously stirred at the reflux temperature for 1½ to 2 hours, then is filtered while warm through a cake of diatomaceous earth. The volume is reduced to about one-half by distillation under reduced pressure and the residual mixture is diluted with approximately 1,000 parts of water, thus effecting precipitation of a white product. This crude product is isolated by filtration and the filtrate is concentrated and cooled to effect precipitation of additional product. The latter material is recrystallized from aqueous ethanol, then combined with the original precipitate. Recrystallization of the combined solids from aqueous ethanol affords, as the ethanolate, 2-aza-17β-acetoxy-19-hydroxyandrost-5-ene-1,3-dione, melting at about 210°–216°. This compound displays infrared absorption maxima at about 2.95, 5.75 and 5.83 microns in chloroform and, in deuterochloroform, nuclear magnetic resonance maxima at about 52, 122, 179, 197, 215, 230, 240, 245, 255 and 355 hertz. This compound is represented by the following structural formula

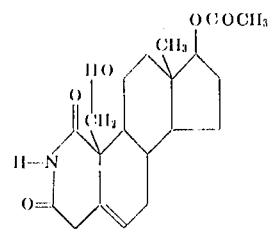

EXAMPLE 11

To a solution of 6 parts of 17β-acetoxy-2-aza-19-hydroxyandrost-5-ene-1,3-dione in 300 parts by volume of acetone, cooled to approximately −25°, is added, over a period of about 2 hours, 12 parts by volume of an aqueous solution 8 N in chromium trioxide and 8 N in sulfuric acid at such a rate as to maintain the yellow color of the excess reagent. This reaction mixture is then allowed to warm to approximately −10° over a period about 1 hour prior to destruction of the excess oxidant by the addition of isopropanol. The reaction mixture is filtered, then partially concentrated under reduced pressure and diluted with water. The precipitate which forms is collected by filtration to afford a mixture consisting of 17β-acetoxy-2-aza-10β-formylestr-5-ene-1,3-dione and 17β-acetoxy-2-aza-10β-carboxyestr-5-ene-1,3-dione. Additional product is obtained by combining the filtered chromium salts with the aqueous mother liquors and isolating by filtration the solid which forms. The combined crude products are purified by recrystallization from aqueous ethanol to yield, as needle-like crystals, 17β-acetoxy-2-aza-10β-formylestr-5-ene-1,3-dione, melting with decomposition at about 275°. This compound exhibits, in chloroform, infrared absorption peaks at about 2.95 and 5.80 microns. Nuclear magnetic resonance maxima are observed at about 56, 126, 194, 376 and 575 hertz. This compound is represented by the following structural formula

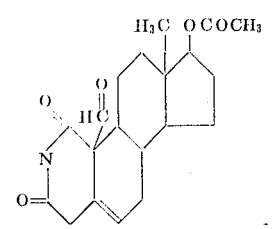

The mother liquors from the aforementioned recrystallization contain 17β-acetoxy-2-aza-10β-carboxyestr-5-ene-1,3-dione.

EXAMPLE 12

To a solution consisting of 2.5 parts of a mixture containing 17β-acetoxy-2-aza-10β-formylestr-5-ene-1,3-dione and 17β-acetoxy-2-aza-10β-carboxyestr-5-ene-1,3-dione dissolved in 50 parts by volume of methanol, in a nitrogen atmosphere, is added 25 parts by volume of 5 percent aqueous sodium hydroxide and the resulting reaction mixture is heated at the reflux temperature for about 1 hour. Neutralization of the mixture is effected by addition of acetic acid and the resulting mixture is diluted with ethyl acetate and saturated aqueous sodium chloride solution in order to form two discrete layers. These two layers are separated and the aqueous solution is extracted several times with ethyl acetate. The combined organic extracts are washed with 5 percent aqueous sodium acetate, dried over anhydrous sodium sulfate and concentrated to dryness under reduced pressure. Recrystallization of the resultilng crude solid product from acetone affords, as the acetone solvate, a mixture of 2-aza-17β-hydroxyestr-5(10)-ene-1,3-dione and 2-aza-17β-hydroxyestr-4-ene-1,3-dione, melting at about 165.5-166.5°. This solvated product displays ultraviolet absorption maxima in methanol at about 320 and 243 millimicrons with molecular extinction coefficients of about 2260 and 6100, respectively. In a mixture of deuterochloroform and deuterotrifluoroacetic acid it exhibits nuclear magnetic resonance peaks at 49, 50, 232 and 378 hertz.

EXAMPLE 13

A solution consisting of a mixture of 0.6 part of 2-aza-17β-hydroxyestr-5(10)-ene-1,3-dione and 2-aza-17β-hydroxyestr-4-ene-1,3-dione in 50 parts by volume of methanol is cooled to 0°-5° under nitrogen and etheral diazomethane is added over a period of about 3 hours until an excess of the reagent persists. At this point a thin layer chromatogram indicates the absence of starting material. The solution is allowed to warm to room temperature while the excess reagent is evaporated under a stream of nitrogen. Removal of the solvents under reduced pressure affords an oily residue, which is purified on a silicic acid chromatographic column, using benzene and benzene-ethyl acetate mixtures as eluants. The early eluates afford, after recrystallization, from aqueous ethanol pure 2-aza-1,3-dimethoxyestra-1,3,5(10)-trien-17β-ol, melting at about 147.5°-148.5°. In methanol this compound exhibits ultraviolet absorption maxima at about 281 and 230 millimicrons with molecular extinction coefficients of 7300 and 9200, respectively. Infrared absorption peaks in chloroform are displayed at 2.75, 6.22, 6.85 and 7.20 microns. In deuterochloroform nuclear magnetic resonance maxima are observed at about 48, 132, 135 and 362 hertz. The later eluates afford, after recrystallization from aqueous acetone, pure N-methyl-2-aza-17β-hydroxy-3-methoxyestra-3,5(10)-dien-1-one, melting with decomposition at about 242°-244°. In methanol it exhibits ultraviolet absorption maxima at 306 millimicrons with a molecular extinction coefficient of 9350 and at 235 millimicrons with a molecular extinction coefficient of 5100. Infrared absorption peaks are observed, in chloroform, at about 2.75, 6.05 and 6.45 microns. In deuterochloroform this compound exhibits nuclear magnetic resonance maxima at about 58, 203, 230 and 316 hertz. This compound is represented by the following structural formula

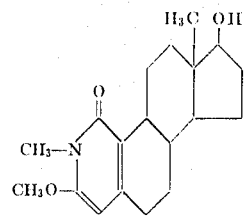

EXAMPLE 14

The substitution of an equivalent quantity of diazoethane in the procedure of Example 5 results in 2-aza-1,3-diethoxyestra-1,3,5(10)-trien-17-one and N-ethyl-2-aza-3-ethoxyestra-3,5(10)-diene-1,17-dione.

EXAMPLE 15

By substituting an equivalent quantity of methyl magnesium bromide and otherwise proceeding according to the procedure described in Example 6, there is produced 2-aza-1,3-dimethoxy-17α-methylestra-1,3,5(10)-trien-17β-ol.

EXAMPLE 16

A mixture consisting of 1 part of 2-aza-1,3-dimethoxyestra-1,3,5(10)-trien-17β-ol, 10 parts of acetic anhydride and 20 parts of pyridine is allowed to stand at room temperature for about 16 hours, then is poured carefully into water. The precipitate which forms is isolated by filtration and dried, thus affording 2-aza-1,3-dimethoxyestra-1,3,5(10)-triene-17β-ol 17-acetate.

EXAMPLE 17

To a solution of 1 part of 2-azaestr-5(10)-ene-1,3,17-trione in 100 parts by volume of benzene is added successively 1.2 parts of silver carbonate and 7 parts of cyclopentyl iodide. The resulting heterogeneous reaction mixture is heated in a nitrogen atmosphere at the reflux temperature for about 16 hours, then is cooled and filtered through diatomaceous earth. The solvent is removed by distillation under reduced pressure and the resulting residue is purified by chromatography on a silicic acid column followed by elution with benzene-ethyl acetate mixtures, thus affording 2-aza-1,3-bis-(cyclopentyloxy)estra-1,3,5(10)-trien-17-one.

EXAMPLE 18

To a suspension containing 1 part of 2-azaestr-5(10)-ene-1,3,17-trione and 0.7 part of trimethylchloro=silane in 10 parts by volume of dioxane is added dropwise 0.7 part of triethylamine dissolved in 5 parts by volume of dioxane. The resulting reaction mixture is stirred at room temperature for about 16 hours and the resulting suspension is filtered to remove triethylamine hydrochloride. The filter cake is washed with dioxane and the filtrate is concentrated to dryness under reduced pressure. The resulting residue is purified by recrystallization from ethyl acetate-hexane, thus affording 2-aza-1,3-bis-(tri=methylsilyloxy)estra-1,3,5(10)-trien-17-one.

EXAMPLE 19

To a solution of ethyl magnesium bromide, prepared from 8.2 parts of ethyl bromide and 1.8 parts of magnesium turnings in 150 parts by volume of tetra=hydrofuran, is added a solution containing 12 parts of 3-tetrahydropyran-2'-yloxyprop-1-yne in 100 parts by volume of tetrahydrofuran. That reaction mixture is heated at the reflux temperature for about 5 minutes, then is allowed to stand at room temperature for about 2 hours. At the end of that time a solution containing 10 parts of 2-aza-1,3-dimethoxyestra-1,3,5(10)-trien-17-one in 150 parts by volume of tetrahydrofuran is added. The resulting reaction mixture is stirred at room temperature for about 2 hours, then is poured carefully into saturated aqueous ammonium chloride. The resulting product is isolated by extraction of that aqueous mixture with methylene chloride.

To a suspension consisting of 10 parts of lithium aluminum hydride nad 200 parts by volume of ether is added, dropwise with stirring, 10 parts of the latter product, i.e. 2-aza-1,3-dimethoxy-17α-(3-tetrahydropyran-2'-yloxypropnyl)-17β-ol, dissolved in 200 parts by volume of ether. The resulting suspension is heated at the reflux temperature with stirring for about 2½ hours, at the end of which time the excess reducing agent is decomposed by the addition of acetone. The metal salts are precipitated by the addition of saturated aqueous sodium sulfate and solid sodium sulfate and the resulting mixture is filtered. The filter cake is washed with methylene chloride and the filtrate is dried over anhydrous sodium sulfate and evaporated to dryness under reduced pressure. The resulting residue is mixed with 200 parts by volume of a 1 percent methanolic hydrogen chloride solution and that mixture is allowed to stand at room temperature for about 15 minutes. At the end of that time approximately 2,000 parts of water is added and the aqueous mixture is extracted with methylene chloride. The organic extracts are washed with water, dried over anhydrous sodium sulfate and evaporated to dryness under reduced pressure, thus affording 2-aza-1,3-dimethoxy-17α-propadienylestra-1,3,5(10)-trien-17β-ol, represented by the following structural formula

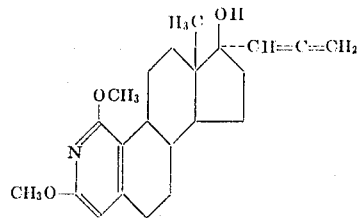

What is claimed is:
1. A compound of the formula

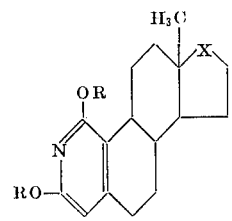

wherein X represents carbonyl, β-hydroxymethylene, β-(lower alkanoyl)oxymethylene, α-(lower alkyl)-β-hydroxy=methylene, α-(lower alkynyl)-β-hydroxymethylene or α-propadienyl-β-hydroxymethylene and R denotes lower alkyl, lower cycloalkyl having 5–7 carbon atoms or tri-(lower alkyl)silyl.

2. As in claim 1, the compound which is 2-aza-1,3-dimethoxyestra-1,3,5(10)-trien-17-one.

3. As in claim 1, the compound which is 2-aza-1,3-dimethoxyestra-1,3,5(10)-trien-17β-ol.

4. As in claim 1, the compound which is 2-aza-17α-ethynyl-1,3-dimethoxyestra-1,3,5(10)-trien-17β-ol.

* * * * *